(12) United States Patent
Baumgartner-Pichelsberger (10) Patent No.: US 6,296,107 B1
(45) Date of Patent: Oct. 2, 2001

(54) INDIVIDUAL CATERPILLAR, IN PARTICULAR FOR TAKE-OFF DEVICES, AND TAKE-OFF DEVICE FOR ELONGATE COMPONENTS

(75) Inventor: Herbert Baumgartner-Pichelsberger, Schlierbach (AT)

(73) Assignee: Greiner Extrusionstechnik GmbH, Kremsmünster (AT)

( * ) Notice: Subject to any disclaimer, the term of this patent is extended or adjusted under 35 U.S.C. 154(b) by 0 days.

(21) Appl. No.: 09/355,874

(22) PCT Filed: Feb. 3, 1998

(86) PCT No.: PCT/AT98/00022

§ 371 Date: Sep. 14, 1999

§ 102(e) Date: Sep. 14, 1999

(87) PCT Pub. No.: WO98/34774

PCT Pub. Date: Aug. 13, 1998

(30) Foreign Application Priority Data

Feb. 6, 1997 (AT) ................................................ 184/97

(51) Int. Cl.[7] .................................................. B65G 15/12
(52) U.S. Cl. ..................................... 198/626.6; 198/626.5
(58) Field of Search ............................. 198/626.5, 626.6; 156/324, 555; 100/307; 425/371

(56) References Cited

U.S. PATENT DOCUMENTS

| | | | | |
|---|---|---|---|---|
| 2,387,446 | * | 10/1945 | Herz ................................. | 198/626.6 |
| 3,068,920 | * | 12/1962 | Chandler et al. .................. | 198/626.6 |
| 3,883,284 | * | 5/1975 | De Mets ............................ | 198/626.6 |
| 3,915,290 | * | 10/1975 | Zuercher et al. .................. | 198/626.6 |
| 4,375,350 | * | 3/1983 | Sato .................................... | 425/371 |
| 5,330,595 | | 7/1994 | Held . | |
| 5,466,329 | * | 11/1995 | Marschke ............................ | 156/470 |

FOREIGN PATENT DOCUMENTS

| | | |
|---|---|---|
| 24 56 830 | 6/1976 | (DE) . |
| 41 29 461 | 12/1992 | (DE) . |

\* cited by examiner

Primary Examiner—Christopher P. Ellis
Assistant Examiner—Mark A. Deuble
(74) Attorney, Agent, or Firm—Collard & Roe, P.C.

(57) ABSTRACT

The invention relates to an individual track (1), in particular for off-take conveyor devices (2), having a base frame (4) and conveyor means (28) arranged thereon for displacing an elongated component (3) relative to the base frame (4). The conveyor means (28) and the guide elements (33) thereof are arranged on at least one individual guide frame (8 to 10) arranged in the direction of displacement of the component (3) and is mounted so that it can be automatically adjusted relative to the base frame (4) at least in a direction perpendicular to the direction of displacement of the component (3) by means of at least one adjustment drive (11). The adjustment drives (11) of the individual guide frame (8 to 10) are designed to apply a uniform pressure force to the component (3) is it is moved along.

22 Claims, 6 Drawing Sheets

INDIVIDUAL CATERPILLAR, IN PARTICULAR FOR TAKE-OFF DEVICES, AND TAKE-OFF DEVICE FOR ELONGATE COMPONENTS

The invention relates to an off-take conveyor device with a top track and bottom track supported on a bed frame, as described in the preamble of claim 1. An off-take conveyor device for elongated components is known from U.S. Pat. No. 5,330,595 A which comprises a top track and a bottom track supported on a bed frame. These two tracks have conveyor means respectively which are in the form of an endlessly circulating conveyor element and are reversed by guide pulleys assigned thereto and spaced apart from one another. The conveyor means for the elongated components are formed by endlessly circulating press bands. Between the guide pulleys individual guide frames are arranged, which are pressed by means of adjustment drives onto the side of the conveyor means facing way from the elongated component. Here the adjustment drives for the individual guide frames are supported on a common bed frame. Furthermore, the individual guide frames on the side facing the conveyor means has guide elements in the form of stationary rollers which produce a linear support of the conveyor means in the region of the rollers of the individual guide frames. By means of the arrangement of the individual guide frames on both sides relative to the conveyor means in the region facing the component a pressing force is obtained on both sides on the component. An adjustment to different operating conditions could not be achieved in all application cases.

A further device for taking off extrusion products is known from DE 24 56 830 A1 which comprises a top track and a bottom track supported in a bed frame. The two tracks also have endlessly circulating conveyor means respectively which are directed on two spaced apart guide pulleys. Between the guide pulleys a holding frame is provided, on which several chain pinions arranged one after the other and supporting the conveyor means are supported by a piston arrangement and a common hydraulic bed in the latter. By means of the self-contained hydraulic bed an automatic adjustment of the chain pinion to a changing cross sectional dimension of the throughput off-take product can be performed. A uniform off-take force during different operating conditions could not be achieved in all application cases as between the immediately consecutive chain pinions a large relative adjustment is made possible.

A different off-take conveyor device for the continual removal of an extruded rod is known from DE 41 29 461 A of the same Applicant, which is formed by two tracks bearing on opposite surfaces of the rod to be removed and coupled with a drive, and said tracks are supported on a machine frame. The two tracks have endlessly circulating conveyor means which are designed in engagement position with the object to be removed so that they have support elements projecting opposite one another which overlap one another in the linear extension position and are supported on top of one another. In this way a tilting of the individual chain pinions is avoided and thus a uniform bearing of the cleats on the object to be removed is achieved. To support the drawing element between the guide pulleys a beam-shaped carrier beam is provided which is supported by adjustment devices on the machine frame mounting the tracks.

Furthermore, various off-take conveyor devices are already known and are commonly referred to as track conveyors. Track conveyors of this type are used for drawing sections and objects made from plasticized plastic material as they are dischared from an extruder after having been calibrated and cooled, to prevent a back-log as plasticized material continues to be drawn into the calibrating region and cooling area. The track conveyor is used as a means of overcoming friction resistance occuring during passage through the calibrator and cooling devices. In order to ensure that the extruded items are of a uniform quality, it is necessary to maintain as even a conveyor speed as possible so that the extruded objects are moved along at as uniform a speed as possible through the calibrator and the cooling devices, to avoid causing further stress in the objects. This being the case, it is essential that an exactly identical speed is maintained in the region of the top track as the sections are conveyed in order to avoid distorting the section. On the other hand, as the objects arrive, at which point they have not yet assumed their final shape in terms of cross-section, it is also essential to be able to control or swivel at least one of the two tracks of the track coveyor in such a way that it can adapt to the hardened profile both as regards height and in terms of inclined position whilst it is being made to the final shape of cross-section as it emerges from the cooling bath.

The underlying objective of the present invention is to provide an off-take conveyor device which is capable of adapting rapidly and with a high degree of operating safety to the most varied of operating conditions during an extrusion process.

This objective is achieved by the invention due to the characterising features outlined in claim 1. The advantage produced is that by guiding the conveyor means through several individual guide frames, the conveyor means is able to adapt individually, across the length of the individual track, to the different states of the section from initial drawing to structuring of the full cross-section of the section. In an unforeseeable and surprising manner, when several objects are running parallel with one another in a parallel extrusion process, in a construction of this type the individual tracks can adapt to different heights of these objects and to portions of these objects having differing thicknesses. It is also advantageous that a simple adjustment of the individual off-take tracks to one another to different requirements is performed automatically. It is also possible to adapt more efficiently and optimally in multiple ways to different component designs. This is of particular advantage if several components are disposed alongside one another or in a stepped arrangement. Furthermore, the conveyor means is capable of adapting individually and more efficiently to the different heights and states of the section across the length of the individual track, from the initial drawing process to structuring of the full cross-section of the section. This is achieved in that the individual guide frames can be even more efficiently adjusted or regulated in terms of height relative to the base frame. It is also advantageous that only one of the individual guide frames has to be retained in its position relative to the base frame in the direction of conveyance in order to prevent any reciprocal shifting in the direction of conveyance. In addition, the transition and perfect guiding of the conveyor means in the transfer region between the single individual guide frames is stepless and free of backlash. By means of a common base frame a more uniform pressure force of the individual tracks can be obtained in the top and/or bottom track on the component. Furthermore, in this way also an opening movement of the top track relative to the object and the base frame can be achieved.

The embodiment defined in claim 2 makes possible an even more sensitive height adjustment or regulation of the single individual guide frames relative to the base frame, enabling greater additional and, above all, more uniform pressure forces to be applied to the object being conveyed.

The embodiment define in claim 3 provides an arrangement in which the supporting roller is able to maintain an even pressure force and can do so across the entire length, when the individual guide frames are in an angled position. This also reduces wear on the guide rails at their inlet and outlet ends.

Also advantageous is the embodiment defined in claim 4, since thre is no need to provide extra specific tensioning devices for the conveyor device or devices. Furthermore, additional longitudinal balancing is guaranteed in the individual states of motion of the individual guide frames relative to the base frame.

In an embodiment such as that outlined in claim 5, wear on the guide rails at the inlet region to and outlet region from the guide pulleys is reduced, which in turn means that fewer friction forces have to be overcome and, consequently, less driving power needs to be applied.

In this arrangement, an embodiment such as that described in claim 6 is of advantage since the guide members may be made from a material with a low friction value, enabling an easy sliding motion if an additional guide provided for the conveyor means in the direction of conveyance. Moreover, still higher and, above all, more even pressure forces can be applied to the object to be conveyed.

An advantageous embodiment defined in claim 7 ensures that the conveyor means is prevented from bearing on and chafing against the base frame when the individual guide frames are shifted into the most unfavourable or farthest position relative to the base frame. This also provides a guiding action and a reduction in reciprocal friction in this segment of the conveyor means.

An advantage is gained from the embodiment outlined in claim 8 due to the fact that largely sandardised or standard components can be used, which also makesit easy to replace individual components. Another feature is that pressure elements such as cleats, for example, can be provided in a simple mounting. This also increases the friction between the component to be conveyed and the conveyor element.

Claim 9 also describes an advantageous embodiment since it produces a higher friction and hence a higher inherent off-take force between the component to be conveyed and the conveyor means.

Claim 10 offers more easy handling and simpler assembly of the cleats on the conveyer means. This makes it easier to replace individual components as well as being cost-effective since standard parts can be used.

The embodiment of claim 11 offers a simple means of balancing between different heights of the component or components to be conveyed.

Another possible embodiment is that of claim 12, which allows even pressure forces to be applied to the components to be tranferred by the individual guide frames.

The structure defined in claim 13 enables automatic balancing between the individual cylinder chambers within the system as a whole.

Claim 14 describes an advantageous embodiment since it ensures that any overloading of the components to be conveyed and hence any damage that would be caused is prevented. Accordingly, the adjusting drives are also protected against overload and hence any consequent damage.

The embodiment described in claim 15 is of advantage since it provides a simple means of rapidly balancing the volume between the adjusting drives within the system as a whole.

Another possible embodiment, however, is that described in claim 16, since leakage losses in the connecting lines and cylinder chambers can be topped up, which means that it is always possible to produce the same pressure conditions within the system as a whole. The system also makes it possible to empty the pressure medium completely and in a simple manner and return it to the pressure source, which is of primary importance when repair work has to be carried.

By virtue of one advantageous embodiment outlined in claim 17, a more even transfer motion can be produced in respect of both a single drawing process and a multiple drawing process.

Claim 18 defines a simple means of flexible adaption to sections having the most varied of cross-sections both in single drawing processes and in multiple drawing processes.

With the embodiment outlined in claim 19, each of the individual tracks can be controlled separately from one another to produce a predetermined conveyance speed, which means that a perfect transfer action can be produced when working with objects of differing cross-sections and at the various resultant extrusion speeds.

Another option is an embodiment such as that defined in claim 20, whereby in a multiple arrangement, a uniform off-take speed can be produced in respect of components to be conveyed. Furthermore, arranging the individual components in a stepped arrangement will prevent any shifting in the direction of conveyance during the transfer movement.

The embodiment described in claim 21 provides an extra adjustment path for the base frame relative to the bed frame, which extends beyond the adjustment path of the individual adjusting drives of the individual tracks relative to the base frame in terms of length.

Finally, another option is an embodiment such as that described in claim 22 which constantly produces a rapid balancing of volume between the individual cylinder chambers of the adjusting drives across the entire system whilst maintaining an even pressure level, thereby ensuring that an even pressure force can be produced across the longitudinal extension of the component or components.

The invention will be described in more detail below with reference to embodiments illustrated in the drawings. Of these.

It should firstly be pointed out that same components of the different embodiments described are denoted by the same reference numerals and the same component names, so that the same meaning can be ascribed to disclosures made throughout the description with regard to same parts with the same reference numerals and same component names. Furthermore, the individual features described in the different examples of embodiments illustrated represent solutions of the invention in their own right.

Figure 1:
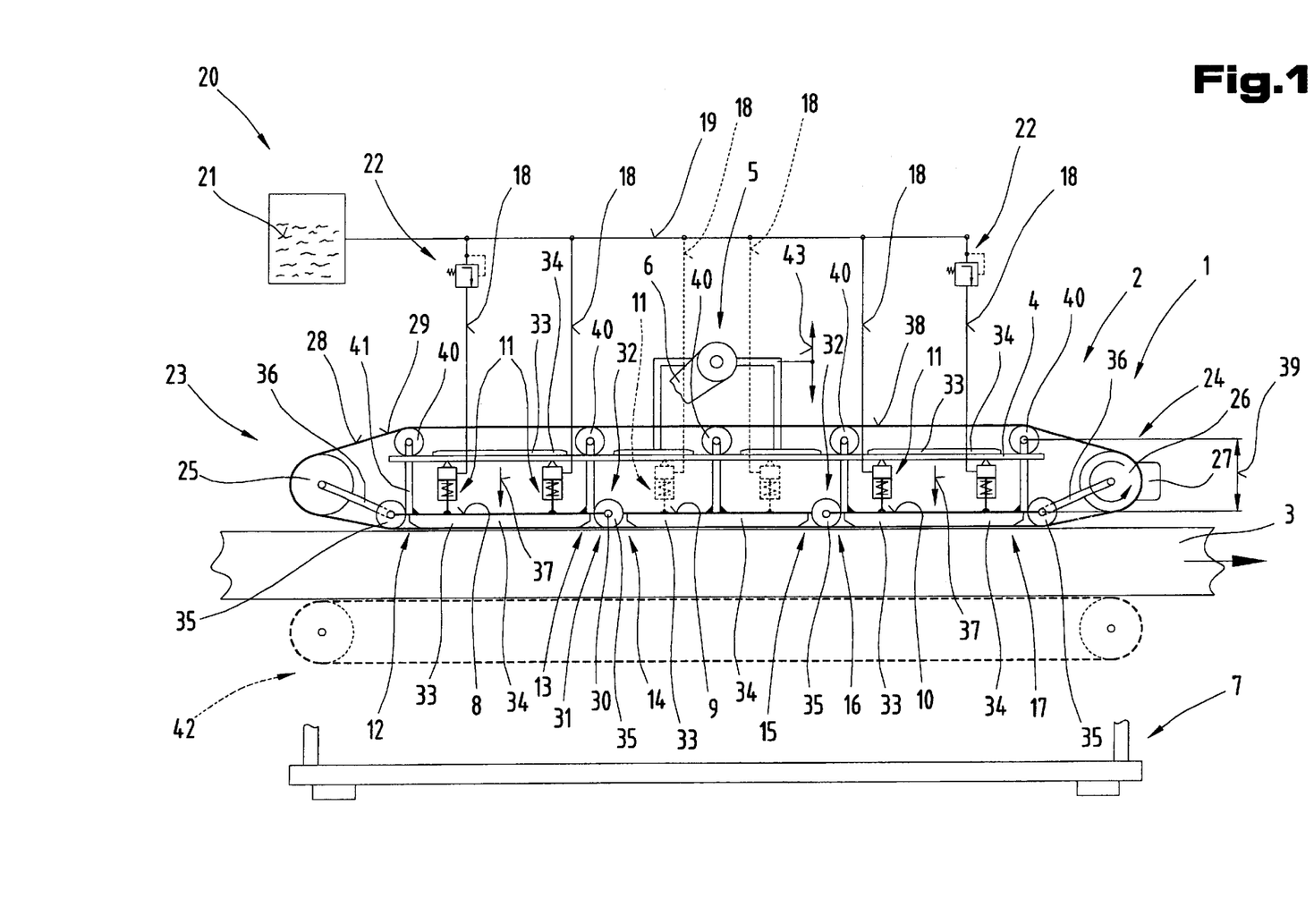
FIG. 1 is an individual track designed as proposed by the invention, having a plurality of individual guide frames arranged one after the other, seen from a side view and in a schematically simplified presentation.
Figure 2:
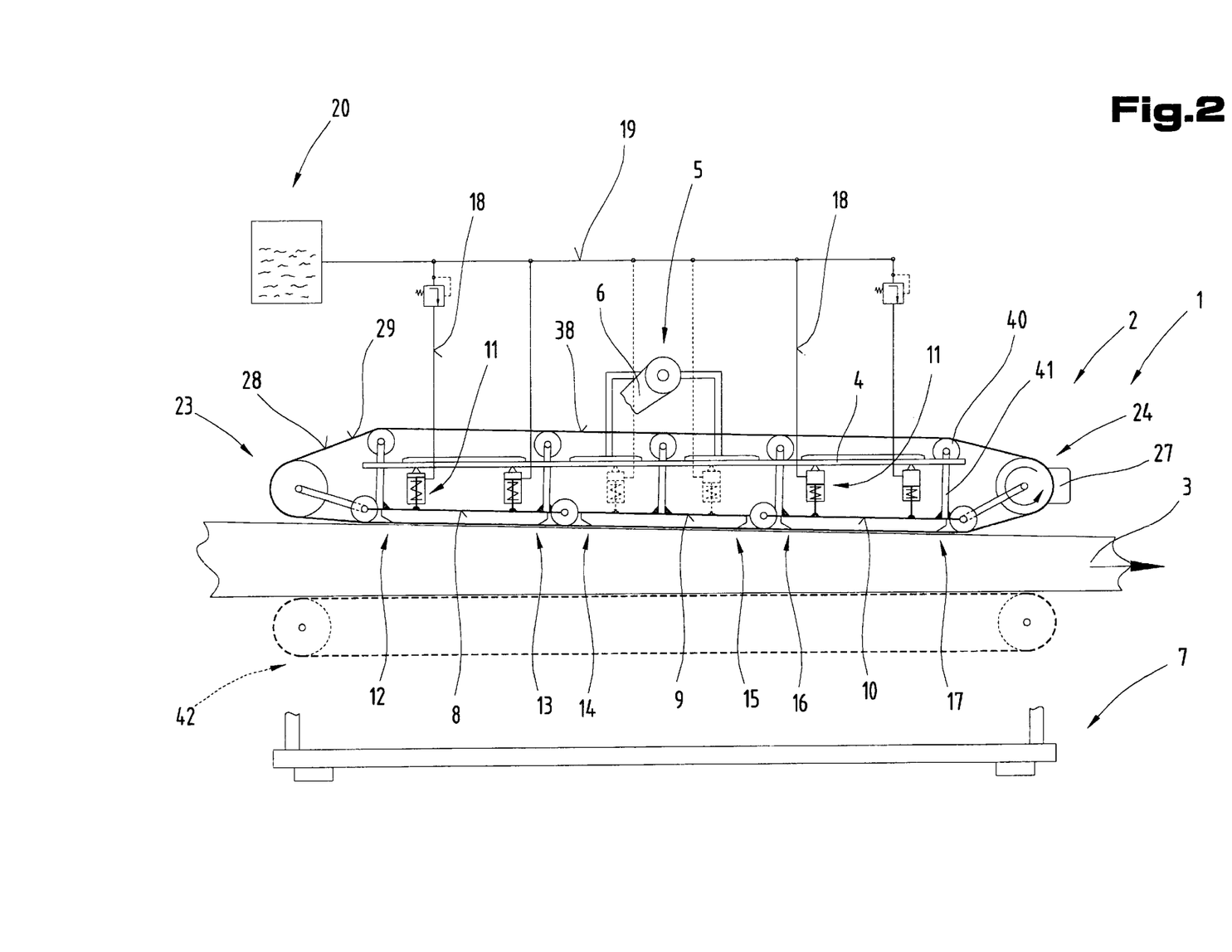
FIG. 2 shows the individual track illustrated in FIG. 1, in a side view, in which the position of the individual guide frames has been adjusted relative to the base frame.

FIGS. 1 and 2 illustrate an individual track 1 of an off-take conveyor device 2 for displacing a component 3 of elongated shape relative to a base frame 4. In order to provide a better insight into how the various components making up the individual track operate, a simplified illustration has been provided which can be more readily described.

The base frame 4 is retained by means of a bearing device 5, illustrated in simplified form, and a swivel arm 6 connected to and able to pivot the bearing device 5 relative to a bed frame 7 of the off-take conveyor device 2, not illustrated in further detail. The detailed description of how the base frame 4 and the individual track 1 are adjusted relative to the bed frame 7 is also illustrated in the subsequent drawings. The base frame 4 is preferably arranged parallel with the direction of displacement of the component 3 and, as described above, is adjustable relative thereto both in terms of height and angular position.

Moreover, the individual track 1 may have several individual guide frames 8 to 10 arranged one after the other, which can be automatically permanently supported or secured relative to the base frame 4, at least in a direction perpendicular to the direction in which the component 3 is displaced, by means of schematically illustrated adjusting drives 11. The adjustment path between the base frame 4 and the individual guide frames 8 to 10 is between 10 mm and 150 mm, preferably between 30 mm and 70 mm In the operating position, the individual adjusting drives 11 are retracted by approximately half their stroke. The number of individual guide frames 8 to 10 will depend on the respective embodiment and may range from a single individual guide frame to any number thereof.

It is possible, for example, to assign at least one adjustment drive 11 to each of the individual guide frames 8 to 10 at each of the end regions 12 to 17 thereof. However, it would, of course, also be possible to assign only a single adjustment drive 11 to each individual guide frame 8 to 10, which would then be arranged in the centre region thereof. To provide a clearer overall view, the retaining elements between the base frame 4 and the individual guide frames 8 to 10 have been left out of the drawing.

Each of the individual adjustment drives 11 may be connected via its own connecting line 18 to a common distributor line 19. This distributor line 19 may run into or be connected with its own pressure source 20, from which a medium 21 is supplied at a pre-settable pressure. In order to prevent any pressure peaks which might occur within the connecting lines 18 and the distributor line 19, each of the connecting lines 18 may be provided with its own pressure relief valve 22, although this is illustrated on only some of them in the drawing. This being the case, the direction of through-flow of the pressure relief valve 22 may be freely chosen to suit the way in which the adjustment drive 11 operates. However, it would also be possible to provide a pressure relief valve 22 for each of the adjustment drives 11.

The essential feature in this system is that a uniform pressure force can be applied across the entire longitudinal run of the individual track 1 by means of the adjustment drives 11 and the individual guide frames 8 to 10 onto the component 3 as it is fed through so as to be able to subject the component to a uniform pressure load in the region overlapping the individual track 1, thereby applying the requisite off-take force.

On either side of the longitudinal extension of the base frame 4 is a respective pulley device 23, 24, in the form of guide pulleys 25, 26, for example. One of these pulley devices may be designed as a drive 27 for an endless conveyor means 28, for example, as schematically illustrated in the case of the guide pulley 26. A conveyor element 29 forming the conveyor means 28 may be provided in the form of a link chain or a round link chain or similar, for example. However, it would also be possible for individual links of the link chain to be designed in the form of cleats, for example, which could be connected to one another and to the conveyor means 28 by means of swivel joints. Irrespective of this, however, it would also be possible to provide individual cleats on the individual links of the link chain, this embodiment being explained in more detail in relation to the subsequent drawings.

However, it would also be possible to connect the individual guide frames 8 to 10 arranged one after the other to one another at their respective facing end regions 13, 14 and 15, 16 about an articulated arrangement 31, such as an articulated joint 32, having a shaft 30 perpendicular to the plane receiving the adjustment drive 11. As illustrated in FIG. 1, this makes it possible to assign the requisite adjustment drives 11 only to the first individual guide frame 8 in the direction of displacement and the last individual guide frame 10 in the direction of displacement, in which case the middle individual guide frame 9 can also be adjusted relative to the base frame 4 in a direction perpendicular to that in which the component 3 is displaced, due to the articulated connection to the two adjacent individual guide frames 8 and 10.

In order to ensure an optimal pressure force by the single individual guide frames 8 to 10 on one of the surfaces of the component 3, a specific guide element 33 for the conveyor means 28 or conveyor element 29, e.g. a guide rail 34, is arranged between the respective end regions 12 to 17 of the single individual guide frames 8 to 10. In order to guarantee a back-lash free or smooth transition of the conveyor element 29 between the facing end regions 13, 14 and 15, 16 facing one another and the guide elements 33 arranged on the individual guide frames 8 to 10 in situations where the single individual guide frames 8 to 10 are in an angled position, at least one supporting roll 35 for the conveyor means 28 is provided in the region of the articulated arrangement 31.

As may also been seen from this drawing, the individual guide frames 8 to 10, as viewed in the direction of displacement of the component 3, are arranged between the two pulley devices 23, 24 or the guide pulleys 25, 26 and enclosed between them. In order to ensure that the conveyor means 28 has a uniform intake angle between the first guide pulley 25 and the end region 12 of the individual guide frame 8 facing it, and between the other guide pulley 26 and the end region 17 of the individual guide frame 10 facing it, at least one supporting roll 35 may also be provided in the two end regions 12, 17 as a support or guide for the endless conveyor element 29, and the individual guide frames 8 to 10 can be retained by means of their own retaining arms 36 which can be angularly pre-adjusted relative to thereto. This ensures that if the individual guide frames 8 to 10 are adjusted relative to the base frame 4, the two pulley devices 23, 24 are also adjusted relative to the base frame 4, thereby always producing the same intake and off-take angle of the conveyor means 28 relative to the direction of displacement of the component 3 in the region of the individual track 1 facing the component 3. However, it is also possible to retain the retaining arm 36 on the base frame 4, so that the conveyor element 29 is not lifted off the guide elements 33 every time the adjustment drives 11 are fully inserted.

The adjustment drives 11 illustrated here consist of cylinder-piston arrangements, for example, which may be pressurised by means of the most varied of pressure means or media 21, such as oil, air, etc., and may be designed as single and/or double acting cylinders. Clearly, other types of adjustment drives 11 may be used, such as resilient bellows with air, spring bellows, spring devices, intermediate elastic elements, for example. As may be seen from FIGS. 1 and 2, at least one of the cylinder chambers of the adjustment drive 11 arranged in the path of the power stroke between the base frame 4 and at least one of the individual guide frames 8 to 10 is pressurised by means of a medium 21 applied at uniform pressure. However, in order to produce a uniform application of pressure force—as indicated by arrow 37—it is of advantage to pressurise all the cylinder chambers of the adjustment drives 11 needed to transmit the force with medium at the same pressure level. This will ensure that the component 3 will not be overloaded or deformed as it is fed through. However, it would also be possible to provide a loop line between the individual adjustment drives 11, making the requisite provisions in respect of the pressure source 20 accordingly. Both closed and open systems can be used to supply the adjustment drives 11.

In order to tension the endless conveyor member 29 evenly without providing special tensioning devices, it is necessary to design the circulation path of the conveyor element 29 so that it is constant and uniform. The essential feature here is that if a relative adjustment is made to the single individual guide frames 8 to 10 relative to the base frame 4, not only that section of the conveyor means 28 directly facing the component 3 is changed to a different position but also that, simultaneously with this relative adjustment, any non-driving free length 38 on the side remote from the component 3 is also adjusted, preferably parallel, relative to the base frame 4 by means of the adjustment drives 11.

During this adjusting movement of each single individual guide frame 8 to 10, it is necessary to feed the respective portion of the non-driving free length 38 arranged opposite one of the individual guide frames 8 to 10 at an even distance 39 from the respective individual guide frame 8 to 10. To this end, each of the individual guide frames 8 co-operates with at least one guide member 40, which is secured or retained on the individual guide frames 8 to 10 co-operating therewith at the predeterminable distance 39 over a stretch of distance 41. To provide additional guidance or support for the non-driving free length 38 on the side of the base frame 4 remote from the individual guide frames 8 to 10, specific guide elements 33, such as guide rails 34, may in turn be provided for guiding or retaining the conveyor means 28 or conveyor element 29. This is primarily of importance if the individual guide frames 8 to 10 are shifted by the individual adjustment drives 11 to a position which is at the farthest distance relative to the base frame 4 in order to prevent the conveyor element 29 from moving to bear on the side of the base frame 4 remote from the individual guide frames 8 to 10. Providing these additional guide elements 33 produces a certain amount of guidance and hence an inherent lateral stability of the non-driving free length 38 relative to the base frame 4.

As also illustrated in FIG. 1, the single individual guide frames 8 to 10, as viewed in their longitudinal extension, total approximately the length of the base frame 4. It would, of course, also be possible to use any number of individual guide frames 8 to 10 to make up the individual track 1 instead of the three illustrated here. Nor is the number of adjustment drives 11 restricted to the number shown in this embodiment and any number of adjustment drives 11 may be provided for the individual guide frames 8 to 10.

In order at least to transfer the component 3 illustrated here after it has been manufactured, starting from an extruder and the adjoining calibration and cooling devices, the individual track 1 illustrated here co-operates with another track 42 on the side of the component remote therefrom, which is illustrated in a schematic form only and very much simplified. In the embodiment illustrated here, the track 42 forms the bottom track and the individual track 1 the upper track for transferring the component 3 out from the extrusion plant.

In order to prevent the component 3 from shifting during the off-take movement, it is of advantage if the track 42 illustrated here is set so that its face facing the component 3 conforms in height to the contour of the section, starting from the extrusion die, the entire individual track 1 being aligned by means of the swivel arm 6 as indicated by the double arrow 43 relative to the extruded component 3 or section and taking account of the adjustment path of the adjustment drives 11.

As may be seen from FIG. 2, the component 3 being fed through is of a differing thickness as viewed across the longitudinal extension of the individual track 1, such as normally occurs at the commencement of the extrusion process, which means that the position of the individual guide frames 8 to 10 have to be set to differing positions relative to the base frame 4 by means of the adjustment drives 11. The individual track 1 as a whole is basically adjusted relative to the bed frame 7 by means of the swivel arm 6. Any additional change in position of the individual guide frames 8 to 10 relative to the base frame 4 is performed by means of the adjustment drive 11 co-operating therewith. This change of position in the individual guide frames 8 to 10 relative to the base frame 4 offers an advantage, particularly in the case of extrusion where various components 3, such as sections, are preferably arranged alongside one another. It ensures that each of the components 3 is arranged so as to receive the requisite pressure force needed to produce the off-take force without one of the components 3 being overloaded or not picked up at all.

It may also be of advantage if at least one of the individual guide frames 8 to 10 can be set by means of its own adjustment drive 11 in terms of its distance relative to the base frame in the region of one of its two end regions 12 to 17 spaced apart from one another in the direction of displacement. By setting this distance, the adjustment drives 11 of several individual guide frames 8 to 10 can also be set or designed to apply an even or uniform pressure force on the component 3 as it is fed through.

Figure 3:
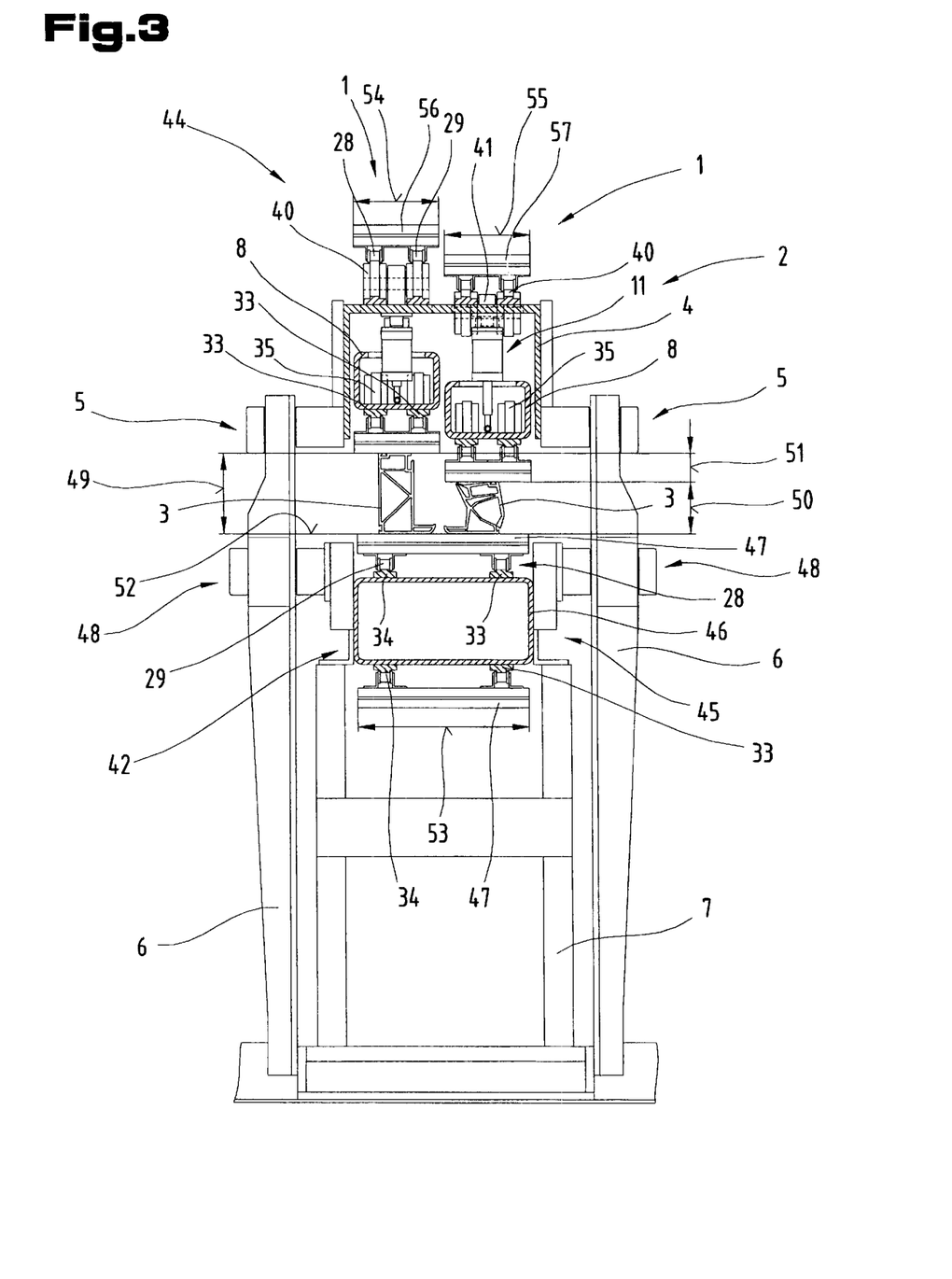
FIG. 3 depicts one possible embodiment of an off-take conveyor device having several individual tracks forming the top track, in cross-section from a front view and in a schematically simplified presentation.

FIG. 3 illustrates one possible and, optionally independent embodiment of the off-take conveyor device 2, which is designed to have a top track 44 comprising two individual tracks 1 arranged parallel alongside one another in the off-take or displacement direction of the component 3, retained or fed separately from one another by means of the adjustment drives 11 relative thereto. In this embodiment, the track 42 illustrated schematically in FIGS. 1 and 2 is provided as a bottom track 45, which co-operates with the two individual tracks 1 of the top track 44 and serves to apply the requisite pressing force and the inherent off-take force to the component 3. The design of the bottom track 45 may be based on any method or means known from the prior art and, as schematically illustrated, is adjustably retained or mounted on the bed frame 7 as required.

The bottom track 45 may be provided as a bearing frame 46, such as a square metal frame, a hollow section or angled section or similar. It is also of advantage to provide specific guide elements 33, both on the side facing the component 3 and on the side of the bearing frame 46 remote therefrom, such as guide rails 34, for example, to provide support for the conveyor means 28, in particular the endless conveyor element 29, in order to guide and support it. Cleats 47 may be retained or secured to the conveyor element 29, which may be a link chain or round-link chain for example, which will come into contact with the component 3 as it is fed along through the off-take conveyor device 2.

As described above and in order to provide a better illustration, the base frame 4 of the top track 44 is adjustably mounted or retained as required relative to the bed frame 7 on swivel arms 6 arranged on either side of the bed frame 7 via bearing devices 5, as viewed in the direction of displacement. In order to perform this movement of relative adjustment, each of the swivel arms 6 co-operates with another bearing device 48 in the region of the bed frame 7, making a sort of levering principle possible so that the desired adjustment movement or location of the top track 44 can be effected relative to the bed frame 7 and the bottom track 45. The swivel arm 6 may be adjusted in any manner known form the prior art and is freely selectable.

Each of the bearing devices 5, 48 co-operating with each swivel arm 6 has a swivel axis, which on the one hand is aligned perpendicular to the off-take direction of the components 3 and on the other parallel with the axes of the guide pulleys 25, 26.

As may also be seen from this drawing, two components 3 arranged parallel alongside one another as viewed in the off-take direction are fed by means of and between the top track 44 and the bottom track 45.

In order to produce an even pressure force and hence the requisite off-take force for both components 3 as the components are being fed along, it is clear from the drawing that the component 3 arranged to the left-hand side has already assumed its full height 49 whilst the component 3 to the right-hand side is still of a smaller height 50. As a result of these differing heights 49, 50, a height differential 51 is produced between them, which is compensated relative to a plane 52 running in the region of the cleats 47 of the bottom track 45 on the side remote from the components 3 by means of the individual tracks 1 forming the top track 44 in conjunction with their respective adjustment drives 11, relative to the base frame 4.

This relative change in position of the individual tracks 1 relative to the base frame 4 is brought about by means of the adjustment drives 11 arranged between the base frame 4 and the individual guide frames 8 to 10, as already explained in detail above. Due to the parallel layout of the two individual tracks 1 and the central supply of the compressed medium 21 to the adjustment drives 11 as required, each of the two components 3 facing the bottom track 45 is pressurised with the same pressure force, which in turn means that the same off-take force can be applied to the two components 3 in the direction of displacement. Clearly, however, the adjustment drives 11 of the two individual tracks 1 may be arranged in a line connection with one another.

As may also be seen from this drawing, the cleats 47 of the bottom track 45 are of a width 53, as viewed transversely to the off-take and displacement direction of the components 3, corresponding to at least the sum of widths 54, 55 of cleats 56, 57 of the two individual tracks 1 forming the top track 44. In this arrangement, however, it is also possible for the widths 54, 55 of the cleats 56, 57 of the two individual tracks 1 of the top track 44 to be different from one another, this being dependent on the number of components 3 and the dimensions thereof and on the layout relative to the components 3. Moreover, the width 53 of the bottom track 45 may also correspond to approximately a width 54, 55 of the cleats 56, 57 of the top track 44. Clearly, however, the individual widths 53, 54, 55 of the cleats 47, 56, 57 relative to one another can be freely selected.

It would, of course, be conceivable to provide the bottom track 45 illustrated here also as an individual track 1, such as outlined in the detailed description relating to FIGS. 1 and 2. Clearly, the number of individual tracks 1 forming the top track 44 and the bottom track 45 can be freely selected depending on the number of components 3 to be picked up. The lay-out and design of the individual guide frames 8 to 10, the adjustment drives 11, the pulley devices 23, 24, the drive 27, the conveyer elements 29 forming the conveyor means 28 and the guide elements 33 co-operating therewith, such as guide rails 34, the supporting rollers 35 and the guide members 40 spaced at a distance apart from the individual guide frames 8 to 10 by means of spacers 41 may be of the same type as described in connection with FIGS. 1 and 2.

Figure 4:
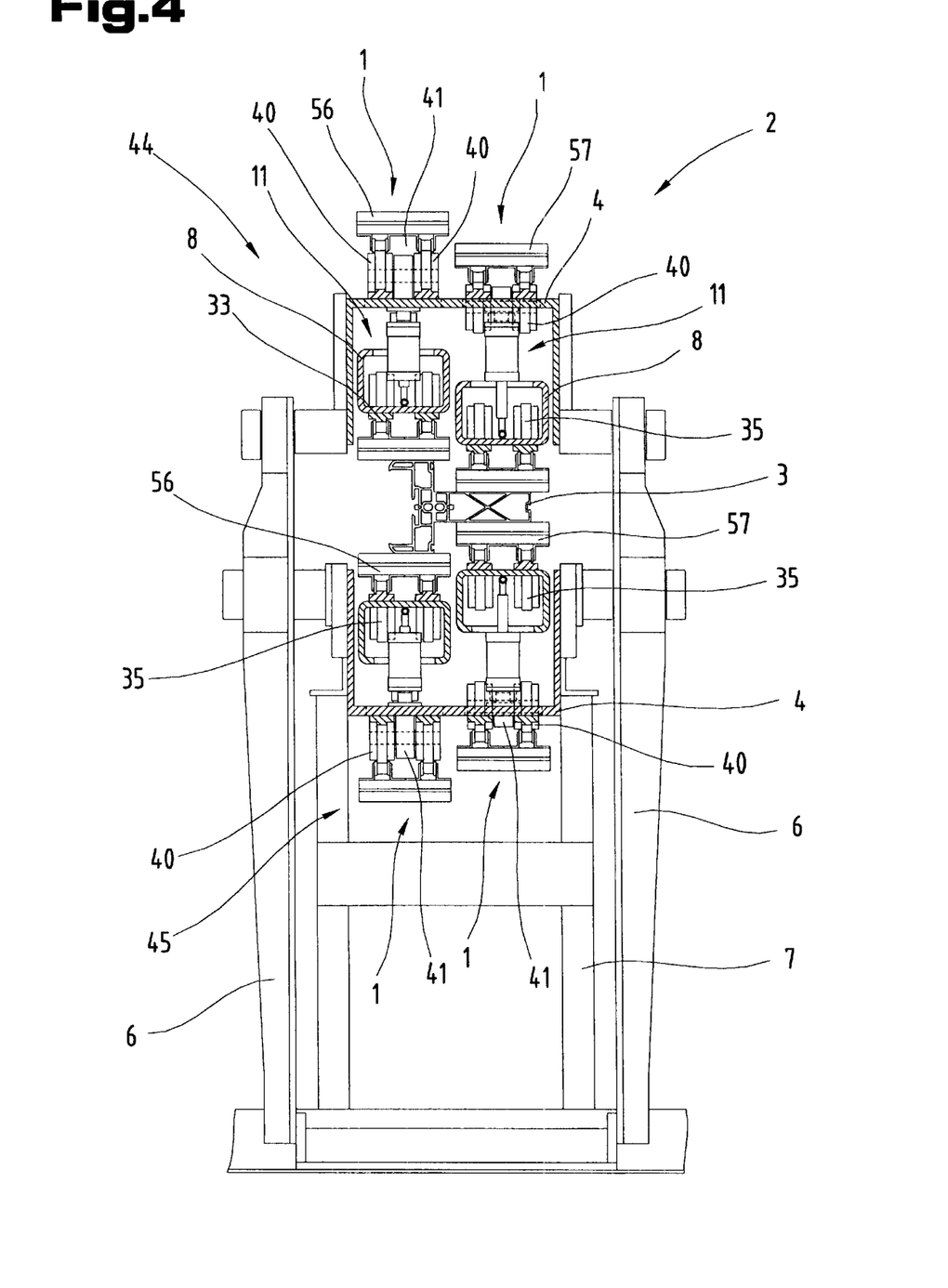
FIG. 4 illustrates another possible embodiment of an off-take conveyor device having individual tracks forming both the top track and the bottom track, seen in cross-section from a front view and in a schematically simplified presentation.

FIG. 4 illustrates another possible and, optionally independent, embodiment of the off-take conveyor device 2, the same reference numerals being used for parts common to FIGS. 1 and 3. In order to avoid unnecessary repetition, reference should be made to the detailed description given in respect of FIGS. 1 to 3 for particulars of individual components having the same reference numeral.

Here too, the top track 44 comprises the two individual tracks 1 arranged alongside and parallel with one another and can be adjusted facing the common base frame 4 and relative thereto by means of the adjustment drives 11 but preferable independently of one another. The base frane 4 is adjusted relative to the bed frame 7 by means of the swivel arms 6 already described in detail above.

In the embodiment illustrated here, the bottom track 45 also comprises two individual tracks 1 arranged alongside and parallel with one another, which in turn are mounted in their own base frame 4 and preferably so that they can be adjusted relative thereto separately from one another, in which case this base frame 4 of the bottom track 45 is mounted so that it can be adjusted and retained relative to the bed frame 7 as required, enabling the height of the face of the cleats 56, 57 facing the component 3 to be adjusted in alignment with the extrusion nozzle. The cleats 56, 57 of the individual tracks 1 iustrated here are each of the same width, as viewed transversely to the direction of extrusion or direction of off-take. However, it would, of course, also be possible, to vary the individual widths relative to one another.

The component 3 illustrated in this case is a hollow section and the cross-section has been selected as only one of many possible cross-section shapes which the component 3 may have. The primary purpose of this design and layout of the top track 44 with its two individual tracks 1 and the bottom track 45 with its two individual tracks 1 is to ensure that a uniform pressure force and the inherent off-take force are applied across the cross-section of the component 3 illustrated in order to prevent it from becoming distorted.

In all the embodiments of the off-take conveyor devices 2 described above, the single tracks may be driven in the most varied of ways. For example, each of the individual tracks 1 may be assigned and coupled with its own, separate, controllable drive 27. However, it would also be possible to assign a common drive 27 to several individual tracks 1, which would enable an even off-take speed to be obtained for several components 3.

Figure 5:
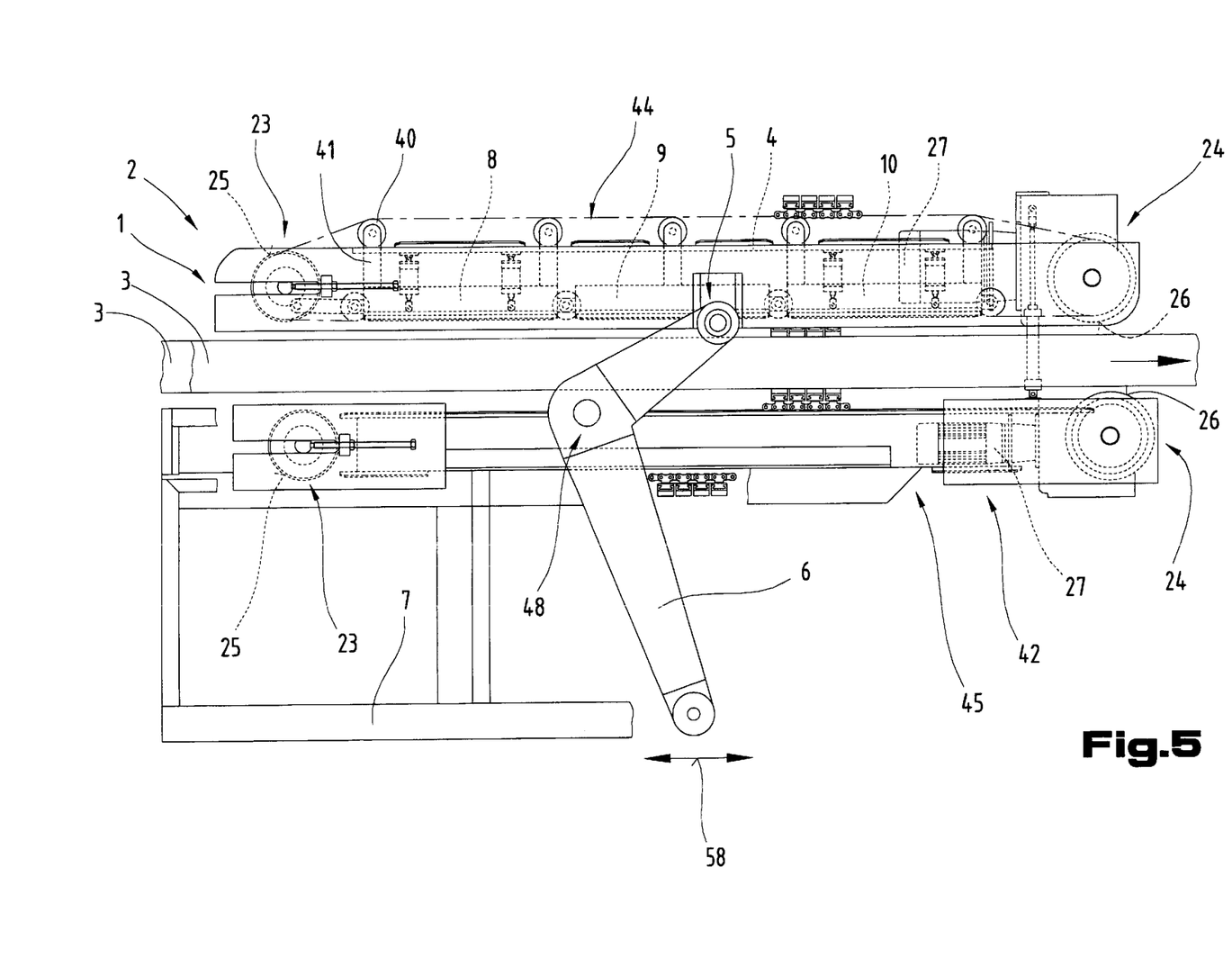
FIG. 5 depicts another possible off-take conveyor device with a top track and a bottom track, seen form a side view and in a schematically simplified presentation.

FIG. 5 illustrates another and optionally independent arrangement of the top track 44 and bottom track 45 forming the off-take conveyor device 2, the same reference numerals being used for parts common to FIGS. 1 to 4.

In this case, the top track 44 and its base frame 4 are retained in position relative to the bed frame 7 by the swivel arms 6 and can be adjusted as required. Between the base frame 4 and a lever arm of the swivel arm 6 is the bearing device 5 and the other bearing device 48 is arranged between the bed frame 7 and another region of the swivel arm 6. By means of an adjustment drive not illustrated in more detail, the swivel arm 6 may be adjusted on the side remote from the bearing device 5 as indicated by a double arrow 58, so that the distance or space between the tracks facing one another, namely the top track 44 and the bottom track 45 can be adjusted to conform to the components 3.

The pulley devices 23 and 24 with their guide pulleys 25, 26 are arranged at the two end regions of the top track 44 and the bottom track 45 spaced apart from one another in the off-take direction. At least one drive 27 may be assigned to the two pulley devices 23, 24, which displace the endless conveyor element 29 of each individual track 1 and track 42.

Figure 6:
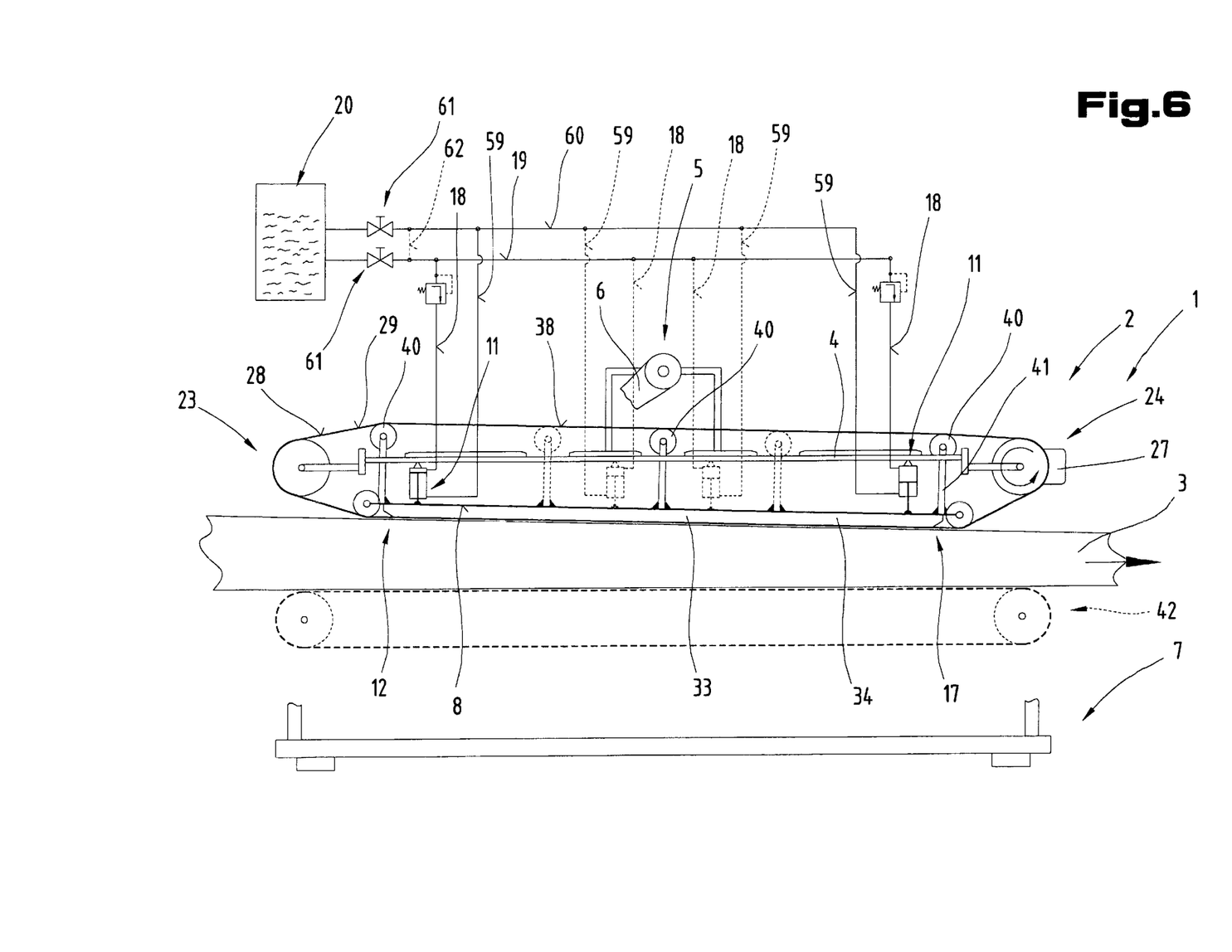
FIG. 6 is another and, optionally, independent embodiment of an individual track, seen from a side view and in a schematically simplified presentation.

FIG. 6 illustrates another individual track 1 of the off-take conveyor device 2 for displacing the elongated component 3 relative to the base frame 4 and, since this embodiment is similar to the individual track 1 described in respect of FIGS. 1, the same parts in this drawing are shown by the same reference numerals. Again, in order to avoid unnecessary repetition, reference should be made to the detailed description of the individual components given in respect of the other drawings above.

In the embodiment of the off-take conveyor device 2 described here, the base frame 4 of the individual track 1 is also adjustably mounted relative to the bed frame 7 by means of swivel arms 6 illustrated in a simplified and schematic form, the bearing device 5 for swivel-mounting the base frame 4 relative to the bed frame 7 being arranged between the swivel arm 6 and the base frame 4. Furthermore, the individual track 1 has the two pulley devices 23, 24 spaced apart from one another in the off-take direction, one of the two, the pulley device 24 in the embodiment illustrated here, co-operating with the drive 27 in order to displace the conveyor means 28 formed by the conveyor element 29. As illustrated in this embodiment, only a single individual guide frame 8 is provided opposite the base frame 4, mounted so as to be automatically adjustable by means of the adjustment drives relative to the base frame 4 in a direction perpendicular to the direction of displacement of the component 3, which also makes it possible to apply a uniform pressure force to the component 3 as it is fed through by means of the pressurised adjustment drives 11 with the individual guide frame 8 across the longitudinal extension thereof. The adjustment drives 11 illustrated here are double acting cylinders and are preferably arranged in the end regions 12, 17 of the individual guide frame 8 facing the pulley devices 23, 24. Other adjustment drives 11 may be provided, distributed as required across the longitudinal extension of the individual guide frame 8, as schematically illustrated by broken lines, and by means of which an even better and more sensitive pressure can be applied to the component 3 to be picked up. The guide element 33 in the form of a guide rail 34 is arranged on the side of the component 3 facing the individual guide frame 8 in order to support the conveyor element 29.

In contrast to the embodiments described above, in this case, the two pulley devices 23, 24 are retained on the base frame 4 and not on the individual guide frame 8. In order to retain clarity, devices for adjusting or tensioning the pulley devices 23, 24 relative to the base frame 4 have been left out of the drawing. As regards the layout of the pulley devices 23, 24, as viewed in terms of height, account must be taken of the minimum and maximum adjustment paths of the adjustment drives and the related adjustment of position of the individual guide frame 8 relative to the base frame 4 in order to avoid the conveyor element 29 being deflected at negative angles relative to the pulley devices 23, 24 when the adjustment drives are in their end position, thereby preventing it from being lifted off the guide elements 33. To obviate the need for additional tensioning devices for the conveyor element 29, the guide members 40 are retained on the side of the base frame 4 remote from the individual guide frame 8 across stretches 41 at a constant distance from the individual guide frame 8, which in this case is of a continuous design. Accordingly, the non-driving free length 38 is guided between the guide members 40 approximately parallel with the individual guide frame 8 and optionally with a corresponding slack.

The adjustment drives 11 illustrated in this embodiment are double acting cylinders, in which the cylinder chambers arranged respectively at the piston end are connected via the connecting lines 18 and by means of the common distributor line 19 to the pressure source 20. Clearly, it would also be possible to provide pressure-reducing valves or pressure-limiting valves on the connecting lines 18 and the distributor line 19. The cylinder chambers of the adjustment drives 11 arranged respectively at the piston-rod end are connected by their own connecting lines 59 to another common distributor line 60, which can in turn be connected to the pressure source 20. Pressure-reducing or pressure-limiting valves may be provided here, too. In addition, as also illustrated, a shut-off member 61 may be arranged in the two distributor lines 19, 60 respectively between the connecting lines 18, 59 and the pressure source 20. These shut-off members 61 are provided so that, for example, when the individual lines have filled up with pressurising medium from the pressure source 20 and have reached a specifically predetermined pressure level they can be cut off from the pressure source 20 and by intermediate switching of their own balancing line 62, as required, a connection can be established between the two distributor lines 19, 60 thereby producing a sort of ring line between the respective cylinder chambers of the individual adjustment drives 11. This ensures that the pressurised medium can be balanced in terms of volume when the position of the individual guide frame 8 is adjusted relative to the base frame 4 whilst maintaining a preferably even pressure level.

In order to feed off the component 3 once it is made, the individual track 1 illustrated in this case co-operates with the other track 42, which is illustrated in schematic and very simplified form only, on the side of the component 3 remote therefrom. In the embodiment illustrated here, the track 42 again forms the bottom track and the individual track 1 the top track for drawing the component out from the extrusion plant.

In order to retain clarity in the drawing, drives, gears as well as the various tensioning devices, covers and the various supply and control lines have been left out of the drawing. Clearly, the parts of the machinery not illustrated in any detail here may be of any type known from the prior art.

It would also clearly be possible to select and use in conjunction with one another, in any combination, any arrangement of the individual tracks 1 used in the embodiments described in relation to FIGS. 1 to 6 to provide a means of applying an even or uniform pressure force to the component 3 or components 3 as viewed across each of the operating lengths of the tracks. However, it would also be possible to arrange the top and bottom tracks 44, 45 relative to one another to the side of the component or components 3 instead of one above the other as illustrated here.

Moreover, if a multiple arrangement of individual tracks 1 is to be provided, it is also possible in respect of the top and bottom tracks 44, 45 to connect the cylinder chambers of the individual adjustment drives 11 of the top track 44 and/or the bottom track to one another respectively. Additionally, however, the adjustment drives 11 of the top track 44 and/or the bottom track 45 may be connected to the adjustment drive of the swivel arm 6, not illustrated in detail here. If using a same pressurising medium and applying the same pressure, this enables a higher adjustment force of the cylinder of the adjustment drives 11 to be produced as compared with the adjustment drive of the swivel arm 6. This will ensure that the base frame 4 does not lift relative to the bed frame 7. However, it may also be of advantage when using double acting cylinders if both cylinder chambers are pressurised at pressures that are higher but different from one another in order to improve the reaction time or response time of the system as a whole.

Finally, it should be pointed out that in the examples of embodiments described above, individual components have been enlarged and are illustrated out of proportion to facilitate understanding of the solution proposed by the invention. Furthermore, individual components of the combinations of features described above for the individual embodiments can be used in conjunction with other individual features from other embodiments to provide other independent solutions of the invention.

Above all, the embodiments illustrated individually in FIGS. 1, 2; 3; 4; 5; 6 may be regarded as independent solutions to the invention in their own right. The tasks and solutions of the invention are set out in the detailed descriptions of these drawings.

List of reference numbers

| | |
|---|---|
| 1 | Individual track |
| 2 | Off-take conveyor device |
| 3 | Component |
| 4 | Base frame |
| 5 | Bearing device |
| 6 | Swivel arm |
| 7 | Bed frame |
| 8 | Individual guide frame |
| 9 | Individual guide frame |
| 10 | Individual guide frame |
| 11 | Adjustment drive |
| 12 | End region |
| 13 | End region |
| 14 | End region |
| 15 | End region |
| 16 | End region |
| 17 | End region |
| 18 | Connecting line |
| 19 | Distributor line |
| 20 | Pressure source |
| 21 | Medium |
| 22 | Pressure relief valve |
| 23 | Pulley device |
| 24 | Pulley device |
| 25 | Guide pulley |
| 26 | Guide pulley |
| 27 | Drive |
| 28 | Conveyor means |
| 29 | Conveyor element |
| 30 | Shaft |
| 31 | Articulated arrangement |
| 32 | Articulated joint |
| 33 | Guide element |
| 34 | Guide rail |
| 35 | Supporting roller |
| 36 | Lever arm |
| 37 | Arrow |
| 38 | Non-driving free length |
| 39 | Distance |
| 40 | Guide member |
| 41 | Spacer |
| 42 | Track |
| 43 | Double arrow |
| 44 | Top track |
| 45 | Bottom track |
| 46 | Bearing frame |
| 47 | Cleat |
| 48 | Bearing device |
| 49 | Height |
| 50 | Height |
| 51 | Height differential |
| 52 | Plane |
| 53 | Width |
| 54 | Width |
| 55 | Width |
| 56 | Cleat |
| 57 | Cleat |
| 58 | Double arrow |
| 59 | Connecting line |
| 60 | Distributor line |
| 61 | Shut-off member |
| 62 | Balancing line |

What is claimed is:

1. Off-take conveyor device for elongated components (3) with a bed frame (7) and with a top track (44) and bottom track (45) supported thereon, each with conveyor means (28), which are formed by endlessly circulating conveyor elements (29), to which two guide pulleys (25, 26) spaced at a distance apart are assigned, and with several individual guide frames (8 to 10) for the conveyor means (28) arranged one after the other and guide elements (33) arranged on the individual guide frames (8 to 10), wherein guide pulleys (25, 26) for the conveyor element (29) enclose the individual guide frames (8 to 10) between them and with at least one adjustment drive (11) assigned to the individual guide frames (8 to 10), characterised in that the top track (44) and/or the bottom track (45) is formed from several parallel arranged individual tracks (1) which are arranged on a common base frame (4), and each of the individual tracks (1) comprises the individual guide frames (8 to 10) with the guide elements (33) and at least one of the individual guide frames (8 to 10) can be fixed relative to the base frame (4) in terms of distance in at least one of its two end regions (12 to 17) spaced at a distance apart and facing the guide pulleys (25, 26) by the adjustment drive (11) independently of the parallel individual track (1), and in that the individual guide frames (8 to 10) arranged immediately one after the other are joined to one another at their end regions (13 to 15) about an articulated arrangement (31) having a shaft (30) perpendicular to the plane receiving the adjustment drive (11).

2. Off-take conveyor device according to claim 1, characterised in that at least one of the individual guide frames (8 to 10) can be fixed relative to the base frame (4) in terms of distance in the region of its two end regions (12 to 17) spaced at a distance in apart in the direction of displacement by means of a respective adjustment drive (11) for each.

3. Off-take conveyor device according to claim 1, characterised in that at least one supporting roller (35) is provided for the conveyor element (29) in the region of the articulated arrangement (31).

4. Off-take conveyor device according to claim 1, characterised in that a guide member (40) is provided on the individual guide frame (8 to 10) across at least a stretch (41) for the non-driving free length (38) of the conveyor element (29).

5. Off-take conveyor device according to claim 1, characterised in that at least one supporting roller (35) is arranged in the end regions (12, 17) of the individual guide frames (8 to 10) facing the guide pulleys (25, 26).

6. Off-take conveyor according to claim 1, characterised in that the guide elements (33) for the conveyor means (28) and the conveyor element are arranged on the individual guide frames (8 to 10) by guide rails (34).

7. Off-take conveyor device according to claim 1, characterised in that guide elements (33), e.g. guide rails (34), for the non-driving free length (38) of the conveyor means (28) and the conveyor element (29) are arranged on the side of the base frame (4) remote from the individual guide frames (8 to 10).

8. Off-take conveyor device according to claim 1, characterised in that the conveyor element (29) consists of a link chain or a round-link chain.

9. Off-take conveyor device according to claim 8, characterised in that individual links of the link chain are formed by means of cleats (47, 56, 57), which are joined to one another by means of articulated joints.

10. Off-take conveyor device according to claim 8, characterised in that cleats (47, 56, 57) are arranged on the individual links of the link chain.

11. Off-take conveyor device according to claim 1, characterised in that the adjustment drive (11) between the individual guide frame (8 to 10) and the base frame (4) consist of at least one cylinder-piston arrangement.

12. Off-take conveyor device according to claim 1, characterised in that the cylinder chambers of the adjustment drives (11) arranged in the power transmission path between the base frame (4) and the individual guide frame (8 to 10) are pressurised by a medium (21) at uniform pressure.

13. Off-take conveyor device according to claim 12, characterised in that the cylinder chambers of the adjustment drives (11) are connected to a common distributor line (19, 60).

14. Off-take conveyor device according to claim 14, characterised in that the distributor line (19, 60) is connected to the pressure source (20) by an intermediate switching system of a shut-off member (61).

15. Off-take conveyor device according to claim 13, characterised in that the pressure source (20) of the medium (21) is a pressure storage.

16. Off-take conveyor device according to claim 1, characterised in that a pressure relief valve (22) is provided in the adjustment drive (11) and the connecting lines (18, 59) between the adjustment drives (11) and a pressure source (20) for the medium (21).

17. Off-take conveyor device according to claim 1, characterised in that a width (53) of cleats (47) of one of the two tracks facing one another, measured transversely to the direction of displacement, corresponds at least to a sum of the widths (54, 55) of at least two cleats (56, 57) of the individual tracks (1) arranged parallel with one another and forming the other track.

18. Off-take conveyor device according to claim 1, characterised in that the individual tracks (1) mounted on a common base frame (4) co-operate with a single track or individual track (1).

19. Off-take conveyor device according to claim 1, characterised in that each of the individual tracks (1) is coupled with its own independently controllable drive (27).

20. Off-take conveyor device according to claim 1, characterised in that a common drive (27) co-operates with several individual tracks (1).

21. Off-take conveyor device according to claim 1, characterised in that the base frame (4) is swivel-mounted on a swivel arm (6), the swivel axis of which is aligned parallel with the axis of the guide pulleys (25, 26) and in that the swivel arm (6) can also be pivoted on the bed frame (7) about an axis parallel with the axis of the guide pulleys (25, 26).

22. Off-take conveyor device according to claim 1, characterised in that the individual cylinder chambers of the individual tracks (1) forming the top and/or bottom track (44, 45) are respectively joined to one another.

\* \* \* \* \*